United States Patent
Su et al.

(10) Patent No.: US 11,753,975 B2
(45) Date of Patent: Sep. 12, 2023

(54) METHOD AND APPARATUS TO ENHANCE FRACTIONAL EFFICIENCY OF DIESEL AND GASOLINE PARTICULATE FILTERS

(71) Applicant: CUMMINS EMISSION SOLUTIONS INC., Columbus, IN (US)

(72) Inventors: Changsheng C. Su, Columbus, IN (US); A. Carl McDonald, Greenwood, IN (US); Ramakrishna Gopal Dontha, Columbus, IN (US); Niklas M. Schmidt, Madison, WI (US); Nathan A. Ottinger, Lenoir City, TN (US); Z. Gerald Liu, Madison, WI (US); James C. Clerc, Columbus, IN (US); Yujun Wang, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/075,031

(22) Filed: Dec. 5, 2022

(65) Prior Publication Data
US 2023/0160326 A1    May 25, 2023

Related U.S. Application Data

(63) Continuation of application No. 17/430,645, filed as application No. PCT/US2019/018163 on Feb. 15, 2019, now Pat. No. 11,519,310.

(51) Int. Cl.
*F01N 3/021* (2006.01)
*F01N 9/00* (2006.01)
(52) U.S. Cl.
CPC .............. *F01N 3/021* (2013.01); *F01N 9/002* (2013.01); *F01N 9/005* (2013.01);
(Continued)

(58) Field of Classification Search
CPC .......... F01N 3/021; F01N 9/002; F01N 9/005; F01N 2610/102; F01N 2610/12; F01N 2610/1453; F01N 2900/1611
(Continued)

(56) References Cited

U.S. PATENT DOCUMENTS

| 4,719,058 A | 1/1988 | Komoda |
| 7,749,314 B2 | 7/2010 | Kondou |

(Continued)

FOREIGN PATENT DOCUMENTS

| CN | 102536391 A | 7/2012 |
| DE | 10 2016 103 735 A1 | 9/2017 |

(Continued)

OTHER PUBLICATIONS

Anderson, et al., "Particle Measurement Programme (PMP) Heavy-duty Inter-laboratory Correlation Exercise (ILCE_HD) Final Report," JRC Scientific and Technical Reports, 2010.
(Continued)

*Primary Examiner* — Jorge L Leon, Jr.
(74) *Attorney, Agent, or Firm* — Foley & Lardner LLP

(57) ABSTRACT

An exhaust aftertreatment system for increasing fractional efficiency of diesel or gasoline particulate filters includes a particulate filter that includes a housing and a filter substrate positioned in the housing. The filter substrate is pre-conditioned with an aqueous solution or suspension configured to decompose or evaporate in response to exposure to heat so as to precondition the filter substrate.

10 Claims, 3 Drawing Sheets

(52) U.S. Cl.
CPC .... *F01N 2430/04* (2013.01); *F01N 2610/102* (2013.01); *F01N 2610/12* (2013.01); *F01N 2610/1426* (2013.01); *F01N 2610/1453* (2013.01); *F01N 2900/1611* (2013.01)

(58) Field of Classification Search
USPC .......................... 60/282, 285, 295, 311, 320
See application file for complete search history.

(56) References Cited

U.S. PATENT DOCUMENTS

| | | | |
|---|---|---|---|
| 8,425,772 | B2 | 4/2013 | Martin et al. |
| 11,149,606 | B2 | 10/2021 | Wessels et al. |
| 2004/0026291 | A1 | 2/2004 | Drozd et al. |
| 2010/0180772 | A1 | 7/2010 | Beall et al. |
| 2010/0266461 | A1 | 10/2010 | Sappok et al. |
| 2011/0239626 | A1 | 10/2011 | Makkee et al. |
| 2013/0074476 | A1 | 3/2013 | Wenninger et al. |
| 2013/0269528 | A1 | 10/2013 | Sappok et al. |
| 2014/0116028 | A1 | 5/2014 | Sappok et al. |
| 2015/0285173 | A1 | 10/2015 | Lundstedt et al. |
| 2016/0363019 | A1 | 12/2016 | Warner et al. |
| 2018/0298799 | A1 | 10/2018 | Wessels |
| 2020/0165947 | A1 | 5/2020 | Rose |
| 2020/0191030 | A1 | 6/2020 | Clowes et al. |
| 2020/0271029 | A1 | 8/2020 | Alig |
| 2021/0025305 | A1* | 1/2021 | Peters ................ F01N 3/035 |

FOREIGN PATENT DOCUMENTS

| | | |
|---|---|---|
| JP | 2013-234610 A | 2/2016 |
| WO | WO-2019/091661 A1 | 5/2019 |
| WO | WO-2019/092186 A1 | 5/2019 |
| WO | WO-2019/092187 A1 | 5/2019 |
| WO | WO-2019/170388 A1 | 9/2019 |

OTHER PUBLICATIONS

Cambustion, "Automated Soot Mass Limit (SML) determination with DPG," Application Note DPG 004 (2015).
Cambustion, "Cold Flow testing on the DPG including hysteresis discussion," Application Note DPG 003 (2015).
Cambustion, "Comparison of DPG and engine soot," Application Note DPG006v01 (2015).
Cambustion, "Diesel Particulate Filter Testing System," retrieved from https://www.cambustion.com/products/dpg, accessed Jan. 23, 2019.
Cambustion, "DPF efficiency measurement on the DPG," Application Note DPG 002 (2015).
Cambustion, "Gasoline Particulate Filter (GPF) testing," Application Note DPG012 (2016).
Cambustion, "Repeatability of DPG Testing," Application Note DPG007 (2015).
Cambustion, "Soot load vs DP characteristic measurement on the DPG," Application Note DPG001v02 (2015).
Cambustion, "Sub-scale and oxygen control accessories," Application Note DPG010 (2015).
Cambustion, "Vehicle Cut to Idle simulation on the DPG," Application Note DPG 005 (2015).
Cambustion, "Zoned loading MSL tests on the DPG," Application Note DPG 009 (2015).
Combined Search and Examination Report issued for UK Application No. GB2212134.7 dated Sep. 15, 2022.
Examination Report issued in UK Patent Application No. GB2111632.2, dated May 27, 2022.
First Examination Report in Indian Appl. No. 202248020710 dated Apr. 25, 2022, pp. 1-5.
Foreign Action other than Search Report in Indian 202047035322 dated Mar. 22, 2021.
International Search Report & Written Opinion in PCT/US2019/018163 dated Jun. 14, 2019.
International Search Report and Written Opinion dated Jun. 14, 2018 for PCT Application No. PCT/US2018/018591.
Kamp, et al., "Ash Permeability Determination in the Diesel Particulate Filter from Ultra-High Resolution 3D X-ray Imaging and Image-Based Direct Numerical Simulations," SAE International Journal of Fuels and Lubricants 10(2), pp. 608-618 (2017).
Kittelson, "Engines and nanoparticles: a review," Journal of Aerosol Science 29(5-6), pp. 575-588 (1998).
Knight "3 Differences between DOC, DPF, and SCR Filters" 0"Aug. 9, 2017 (Aug. 9, 2017) p. 1 para[0002], (0004]; Retrieved from http://www.hartridge.com/blog/3-differences-between -doc-dpl-and-scr-rllters Apr. 20, 2018.
Liu, et al., "Diesel Particulate Filters: Trends and Implications of Particle Size Distribution Measurement," SAE 2003 World Congress & Exhibition (2003).
Liu, et al., "Influence of Engine Operating Conditions on Diesel Particulate Matter Emissions in Relation to Transient and Steady-State Conditions," Environmental Science & Technology 41(13, pp. 4593-4599 (2007).
Liu, et al., "Measuring the Fractional Efficiency of Diesel Particulate Filters," SAE 2002 World Congress & Exhibition (2002).
Non-Final Office Action in U.S. Appl. No. 16/970,659 dated Oct. 5, 2021.
Parkin, Chris, "Minutes of 25th PMP Informal Group Meeting," Cleaner Fuels and Vehicles, Jan. 21, 2010.
Proposal transmitted by the expert form tht UK, "Annex 4C—Particle Number Mearsurement Test Procedure," Working paper No. GRPE-PMP-25-03 25th PMP meeting, Jan. 11, 2010.
United National Agreement Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions, Addendum 48: Regulation No. 49, Annex 4C, E/ECE/324/Rev.1/Add.48/Rev.5/Amend.1-E/ECE/TRANS/505/Rev.1/Add.48/Rev.5/Amend.1, Jul. 7, 2011.
Watson, A.G. Simon; "Lubricant-Derived Ash—In-Engine Sources and Opportunities for Reduction," Massachusetts Institute of Technology, Jun. 2010.
Watson, Simon A.G., "Lubricant-Derived Ash—In-Engine Sources and Opportunities for Reduction," Massachusetts Institute of Technology, Apr. 30, 2010.

* cited by examiner

METHOD AND APPARATUS TO ENHANCE FRACTIONAL EFFICIENCY OF DIESEL AND GASOLINE PARTICULATE FILTERS

CROSS-REFERENCE TO RELATED APPLICATIONS

The present application is a continuation of U.S. patent application Ser. No. 17/430,645, filed Aug. 12, 2021, which is a National Stage of PCT Application No. PCT/US2019/018163, filed Feb. 15, 2019. The contents of these applications are hereby incorporated by reference in their entireties.

TECHNICAL FIELD

The present disclosure relates generally to aftertreatment systems for use with internal combustion ("IC") engines.

BACKGROUND

Exhaust aftertreatment systems are used to receive and treat exhaust gas generated by engines. Exhaust gas aftertreatment systems utilize any of several different components to reduce the levels of harmful exhaust emissions present in exhaust gas. For example, certain exhaust gas aftertreatment systems for diesel-powered IC engines comprise a selective catalytic reduction ("SCR") system, including a catalyst formulated to convert $NO_x$ (NO and $NO_2$ in some fraction) into harmless nitrogen gas ($N_2$) and water vapor ($H_2O$) in the presence of ammonia ($NH_3$). Aftertreatment systems may also include a filter such as a particulate filter, configured to remove particulate matter ("PM"), such as, soot, dust, inorganic particles, and the like from the exhaust gas.

SUMMARY

Embodiments described herein relate generally to systems and methods for increasing fractional efficiency of diesel or gasoline particulate filters. In one or more embodiments, an example particulate filter includes a housing that includes an inlet cone. A filter substrate is positioned in the housing. A predetermined amount of ash is attached to the inlet cone and is configured to be released into exhaust gas flowing through the inlet cone.

In one or more embodiments, an example system is an exhaust aftertreatment system that includes a particulate filter and an ash dispenser positioned upstream of the particulate filter. The ash dispenser is configured to release ash into exhaust gas upstream of the particulate filter.

In one or more embodiments, an example exhaust aftertreatment system includes a particulate filter and a filter positioned upstream of the particulate filter. The filter is configured to release an additive material from which ash is generated.

In one or more embodiments, an example particulate filter includes a housing and a filter substrate is positioned in the housing. The filter substrate is pre-conditioned with an aqueous solution or suspension configured to decompose or evaporate into a predetermined amount of ash in response to exposure to heat so as to pre-condition the filter substrate.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
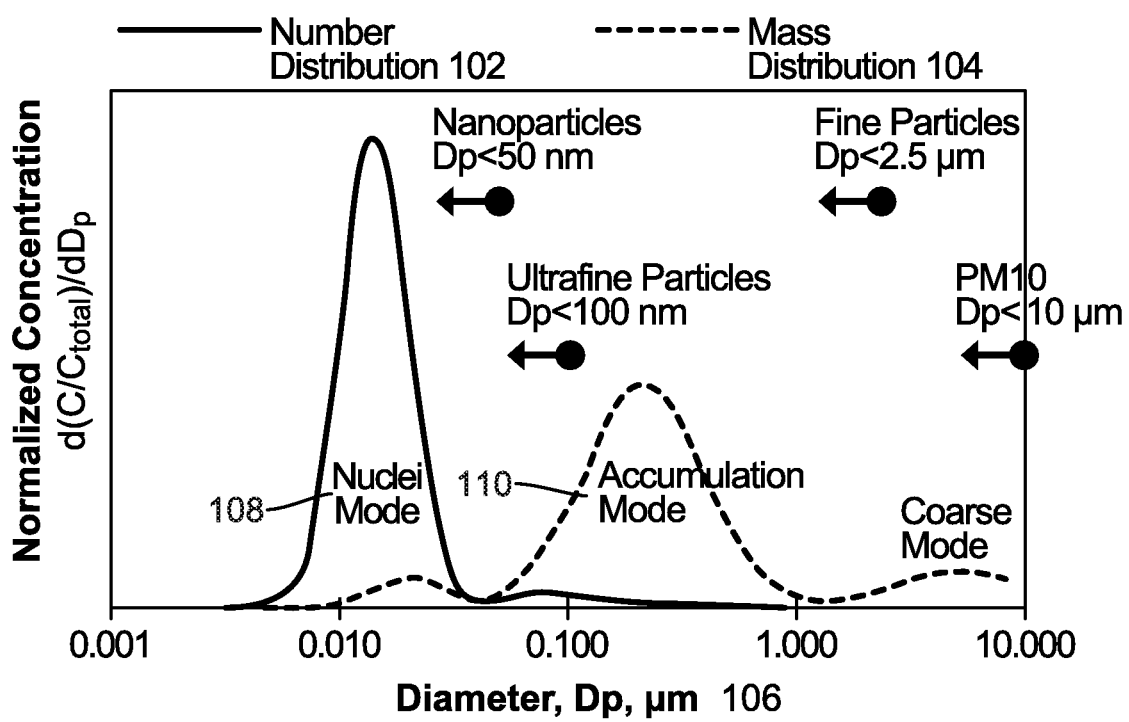
FIG. 1 is a chart illustrating normalized distributions of PM particulate number and PM particle mass as a function of PM particle diameter for exhaust gas produced by a diesel (compression ignition) engine.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate to an exhaust aftertreatment system and a particulate filter configuration that can be used, for example, to increase fractional efficiency (e.g., particulate number filtration efficiency, filtration efficiency, etc.) of diesel or gasoline particulate filters. The embodiments can release ash or an additive material (from which ash is generated) into exhaust gas upstream of the particulate filter.

Overview of PM Emissions

PM emissions can be characterized in terms of mass or particulate number ("PN"). PM mass refers to the total mass of PM particles that are emitted. Particulate number refers to the total number of individual PM particles that are emitted.

FIG. 1 is a chart illustrating normalized distributions of PM particulate number 102 and PM particle mass 104 as a function of PM particle diameter 106 for exhaust gas produced by a diesel (compression ignition) engine. As shown in FIG. 1, diesel PM particles vary in size in a bimodal distribution including "nuclei mode" particles 108 and "accumulation mode" particles 110. Nuclei mode particles 108 have relatively small diameters of approximately 3-30 nanometers (nm). Nuclei mode particles 108 comprise a small amount of total PM mass, but comprise the majority of total particulate number. Accumulation mode particles 110 have relatively large diameters of approximately 30-500 nm. Accumulation mode particles 110 comprise the majority of total PM mass, but comprise a small amount of total PM particulate number. In other words, nuclei mode particles 108 have high particulate number and low mass, and accumulation mode particles 110 have a low particulate number and high mass.

In contrast to PM produced by compression ignition engines, PM produced by spark ignition engines, such as engines that operate using gasoline or other fuels (e.g., ethanol, compressed natural gas, liquid petroleum gas, etc.) is predominately small in diameter (e.g., 60-80 nm). Additionally, some compression ignition engines, such as non-exhaust gas recirculation (non-EGR) engines for off-road applications, typically have high operational temperatures and high engine-out NOR, which reduces PM emissions. Therefore, there has historically been less focus on reducing PM emissions for spark ignition engines than for compression ignition engines.

Emissions regulations have historically defined diesel PM emissions limits in terms of mass. However, there has recently been more and more focus on particulate number in view of studies that have shown adverse health effects of inhalation of small PM particles, which make up the majority of particulate number. In fact, emissions regulations in certain countries and regions, such as the European Union, China, and India, define PM limits for both diesel and gasoline engines in terms of both PM mass and particulate number. Similar regulations are contemplated in the United States. Therefore, there is a need to design exhaust aftertreatment systems to minimize PM emissions in terms of both mass and particulate number.

Diesel engine systems typically utilize particulate filters to capture PM so as to reduce PM emissions to an acceptable level. Particulate filters structured to be used with diesel engines are typically referred to as diesel particulate filters ("DPFs"). DPFs typically utilize porous ceramic filter media including a large number of parallel channels. Adjacent channels are closed off at each end by plugs to force the exhaust gas to flow through the porous channel walls. PM in the exhaust gas collects within the pores (referred to as depth filtration) and on the surface of the walls (referred to as surface filtration). Over time, PM builds up in the pores and on the surface of the channel walls and forms a "soot cake." The soot cake improves fractional efficiency by acting as an additional filter medium. In fact, DPF fractional efficiency is dominated by the soot cake most of the time.

Certain spark ignition engine systems also utilize particulate filters to capture PM so as to reduce PM emissions to an acceptable level. For example, gasoline direct injection ("GDI") engines produce a non-trivial amount of PM (e.g., during cold start and high load operation). In addition, increased scrutiny and regulation of PM particulate number emissions may require use of particulate filters on more and more types of spark ignition engine systems. Particulate filters structured to be used with gasoline engines are typically referred to as gasoline particulate filters ("GPFs"). GPFs typically utilize porous ceramic filter media including a large number of parallel channels, similar to DPFs. However, because gasoline engines produce less particulate matter than diesel engines, GPFs are less likely than DPFs to form a soot cake. Therefore, GPFs exhibit lower fractional efficiency than DPFs, especially for small PM particulates for which filtration is typically dominated by the soot cake.

Soot cakes are formed from PM including a combination of carbonaceous soot and metallic ash trapped in the particulate filter. Carbonaceous soot makes up the vast majority of PM by mass. Ash, which makes up a relatively small amount of PM by mass, may consist of various metallic compounds originating from lubricant additives, trace elements in fuel, and engine wear. Ash may include inorganic crystalline particles from degraded lubricant additives (e.g., detergents, anti-oxidants, anti-wear compounds, etc.). Ash may include, for example, CJ4 oil (e.g., oil with calcium, magnesium, and zinc, etc.).

The amount of PM trapped in the particulate filter increases over time during operation. Eventually, the PM trapped in the particulate filter builds up to a level that causes exhaust backpressure to increase to a level that causes degraded performance of the engine. The soot must be periodically removed via regeneration to reduce the backpressure to acceptable levels. However, the accumulated ash remains in the filter after regeneration.

Ash accumulation in particulate filters (e.g. DPFs) alters the filter geometry (e.g., microstructure, etc.) by accumulating in the pores in the filter medium, thereby effectively decreasing the pore size. Accordingly, the accumulated ash serves as additional filtration media, thereby increasing the overall fractional efficiency in particulate filters. It has been found that even a relatively low level of ash loading (e.g., less than 2 g/L) can improve fractional efficiency sufficiently so as to meet PM emissions requirements.

In conventional systems, ash accumulates in the particulate filter over a period of initial use (e.g., a break-in period) of the engine and aftertreatment system. Machined cylinder and ring surfaces of an engine conform to each other's shape during the initial break-in period of the engine. The resulting tight seal between the cylinder and ring surfaces prevents the escape of unburned fuel and pressurized gasses into the crankcase, while also preventing crankcase oil from getting into the combustion chamber. During break-in, metallic compounds from oil consumption and engine wear contribute to ash formation and ash accumulation on the particulate filter.

One challenge associated with DPFs is the ability to meet PM emissions requirements during the initial usage period of the DPF (e.g., on a newly manufactured engine system or newly installed DPF). Fractional efficiency for a clean, unused DPF is relatively low until the DPF has accumulated a sufficient amount of PM to form a soot cake. Ash accumulation on the wall also affects the geometry of a DPF during the initial operating period and improves fractional efficiency. Accordingly, it may be difficult to meet PM emissions requirements during the initial operating period of DPFs.

Embodiments of Systems and Methods for Pre-Conditioning a Particulate Filter Various embodiments of the present disclosure relate to systems and methods for pre-conditioning a particulate filter with ash so as to improve fractional efficiency of the particulate filter. The systems and methods are used with DPFs, GPFs, and particulate filters designed for use with other types of fuels. As will be appreciated, the systems and methods described herein provide various technical advantages over existing PM filtration systems. For example, preconditioning particulate filters with ash via the systems and methods described herein improves the fractional efficiency of the particulate filters compared to existing PM filters, especially with regard to small diameter PM and with regard to the initial operation period of an engine system. The preconditioning systems and methods described herein significantly reduce the amount of time needed to precondition a particulate filter. For example, by actively or passively dispensing ash into the particulate filter, the fractional efficiency of the particulate filters reaches a target fractional efficiency much faster than is possible using conventional break-in methods. The systems and methods described herein also improve fractional efficiency of particulate filters for spark ignition engines, which may not be capable of achieving sufficient ash accumulation via conventional break-in methods.

The preloading amount of ash and the duration over which the ash is dispensed into the particulate filter depends on engine and aftertreatment component characteristics (e.g., engine displacement, intended fuel, aftertreatment system architecture, particulate filter volume, etc.). According to various embodiments, the preloading amount of ash with which to pre-condition the particulate filter is determined based on a difference between an initial fractional efficiency of the particulate filter and a target fractional efficiency. The preloading amount of ash is dispensed into the particulate filter so as to pre-condition the particulate filter.

According to various embodiments, the ash can be dispensed into the particulate filter in various ways. For example, in some embodiments, the system includes a chemically active filter medium configured to release a material that causes the generation of the ash that will preload the particulate filter. The amount of additive material that is released corresponds to an amount necessary to produce the preloading amount of ash needed to precondition the particulate filter to achieve the target fractional efficiency. In some embodiments, the chemically active filter medium is contained in a fuel filter. The chemically active filter medium is configured to controllably release an additive material into fuel during initial operation of the engine. The additive material is configured to cause an increased amount of ash that will be generated when the fuel is combusted.

In other embodiments, the chemically active filter medium is contained in another type of filter, such as a lubricating oil filter. For example, in some embodiments, the system includes a lubricating oil filter that has a chemically active filter medium. The chemically active filter medium of the lubricating oil filter is configured to controllably release an additive material into lubricating oil during initial operation of the engine. The additive material is configured to oxidize during operation of the engine to generate ash that is released into the exhaust gas. The amount of additive material dosed into the lubricating oil is related to a rate of ash loading.

In some embodiments, the exhaust aftertreatment system includes an ash dispenser positioned upstream of the particulate filter. The ash dispenser is configured to dispense ash (e.g., ash powder) and/or an additive material (configured to generate ash once dispensed into the exhaust gas) into the exhaust gas during a break-in period. The amount of ash and/or additive material released into the exhaust gas corresponds to an amount necessary to produce the preloading amount of ash needed to precondition the particulate filter to achieve the target fractional efficiency.

In some embodiments, the dispensing device is an active device that is configured to dispense the ash and/or additive material in response to receiving a control signal. In other embodiments, the dispensing device is a passive device that is configured to dispense the ash and/or additive material in response to exposure to certain environmental conditions (e.g., exposure to heat) rather than in response to receiving a control signal. In each embodiment, the ash is dispensed into the particulate filter so as to form a uniform distribution on the filter medium.

In some embodiments, an aqueous solution is pre-applied to the particulate filter that is configured to decompose or evaporate into a layer of ash in response to exposure to heat. The amount (e.g., volume or mass) and/or the composition of the aqueous solution corresponds an amount necessary to produce to the preloading amount of ash needed to precondition the particulate filter to achieve the target fractional efficiency.

In some embodiments, the ash is deposited (e.g., bonded, adhered, etc.) onto an exhaust component prior to the break-in period so as to be released from the exhaust component during the break-in period. For example, in some embodiments, the ash dispensed into the particulate filter further includes a binder material mixed with ash powder so as to facilitate attachment of the ash to an exhaust component upstream of the particulate filter or to an inlet cone of the particulate filter.

In some embodiments, the filter substrate is pre-conditioned with an organo-metallic solution. The organo-metallic solution is configured to dispense a predetermined amount of ash-forming material into fuel for the engine or lubricant utilized by the engine such that the ash is formed during the break-in period.

Figure 2:
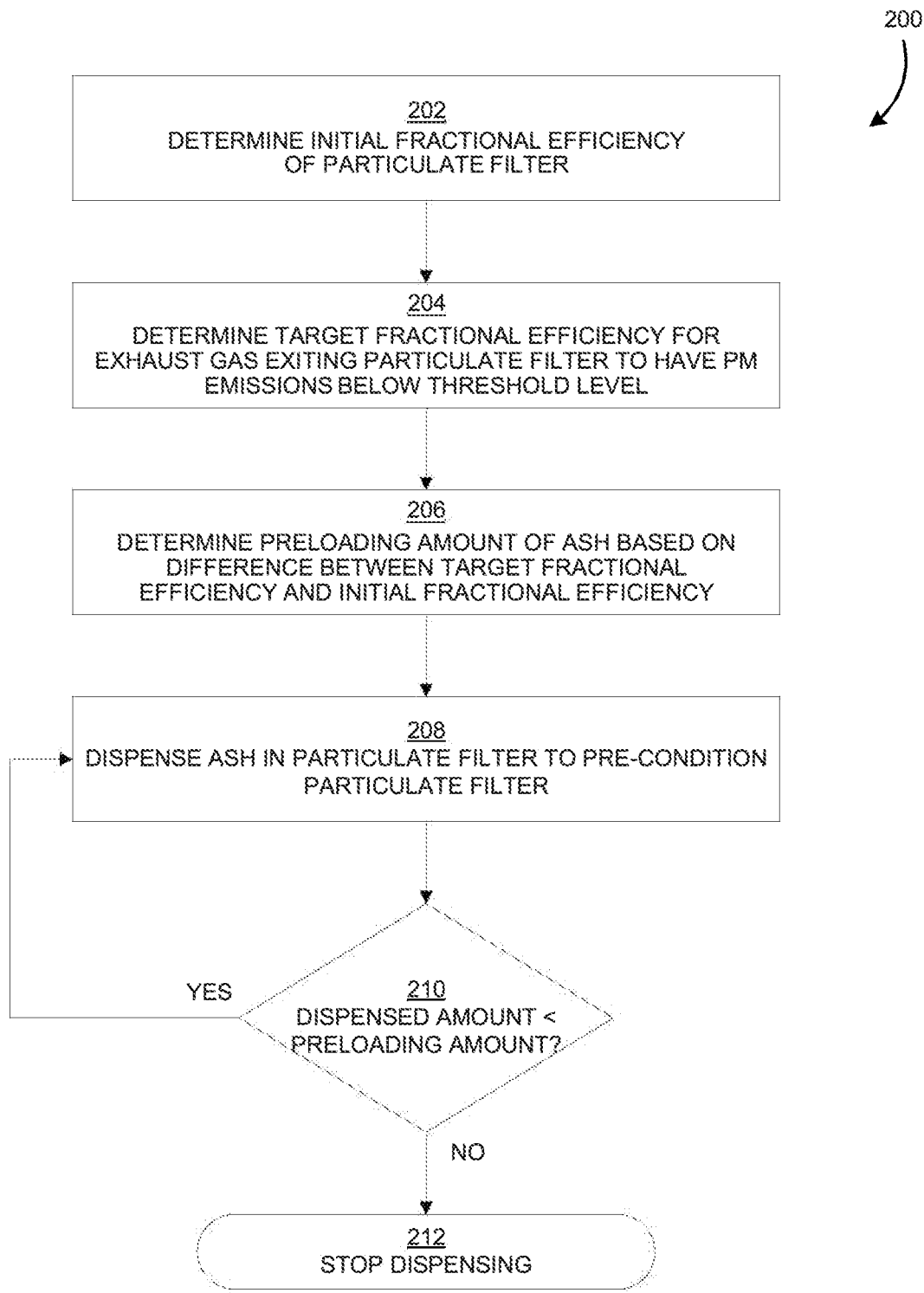
FIG. 2 is a flow diagram illustrating an example method of pre-conditioning a particulate filter, according to an example embodiment.

FIG. 2 is a flow diagram illustrating an example method 200 of pre-conditioning a particulate filter, according to an example embodiment.

At 202, an initial fractional efficiency for a particulate filter of an exhaust aftertreatment system is determined. Fractional efficiency of a filter is a ratio of an amount of particulate matter captured by the filter medium of the filter to an amount of particulate matter entering the particulate filter. The initial fractional efficiency can be determined in various ways, such as by testing the filter according to the procedure set forth in ISO 29463-1. In some embodiments, fractional efficiency is determined using an empirical model developed by the inventors. For example, in some embodiments, fractional efficiency is determined as a function of physical characteristics of the filter medium, such as porosity, pore size, and wall thickness.

At 204, a target fractional efficiency for the particulate filter is determined. The target fractional efficiency is a fractional efficiency required for exhaust gas exiting the particulate filter to have a measured particulate matter emission level below a threshold particulate matter emission level. As stated above, fractional efficiency is a ratio of an amount of particulate matter captured by the filter medium of the filter to an amount of particulate matter entering the particulate filter. The particulate matter emission level is an amount of particulate matter exiting the particulate filter, which is a difference between the amount of particulate matter entering the particulate filter and an amount of particulate matter captured by the filter medium of the filter. Therefore, the target fractional efficiency is determined by dividing a difference between an amount of particulate matter entering the particulate filter and a threshold particulate matter level by the amount of particulate matter entering the particulate filter.

At 206, a preloading amount of ash to be released onto the particulate filter is determined based on a difference between the target fractional efficiency and the initial fractional efficiency. The target fractional efficiency is minimum fractional efficiency required (e.g., by a regulation, etc.). The target fractional efficiency may be a function of engine, filter, and other requirements (e.g., certification requirements, local regulation requirements, etc.). The preloading amount of ash may be determined by measuring particulate number efficiency of the particulate filter with no ash (e.g., at 0 ash loading, etc.), with an ash loading of 0.1 gm/L, with an ash loading of 0.5 gm/L, and with an ash loading of 1 gm/L, and using a correlation (e.g., linear correlation, curve of best fit, etc.) between these measurements and the target fractional efficiency to determine the preloading amount of ash.

At 208, ash is dispensed into the particulate filter so as to pre-condition the particulate filter.

At 210, it is determined whether the amount of ash dispensed into the particulate filter is less than the preloading amount of ash determined at 206. If the result of 210 is "YES," ash is continued to be dispensed at 208. If the result of 210 is "NO,' meaning that the preloading amount of ash has been dispensed into the particulate filter, the dispensing of ash is stopped at 212.

Figure 3:
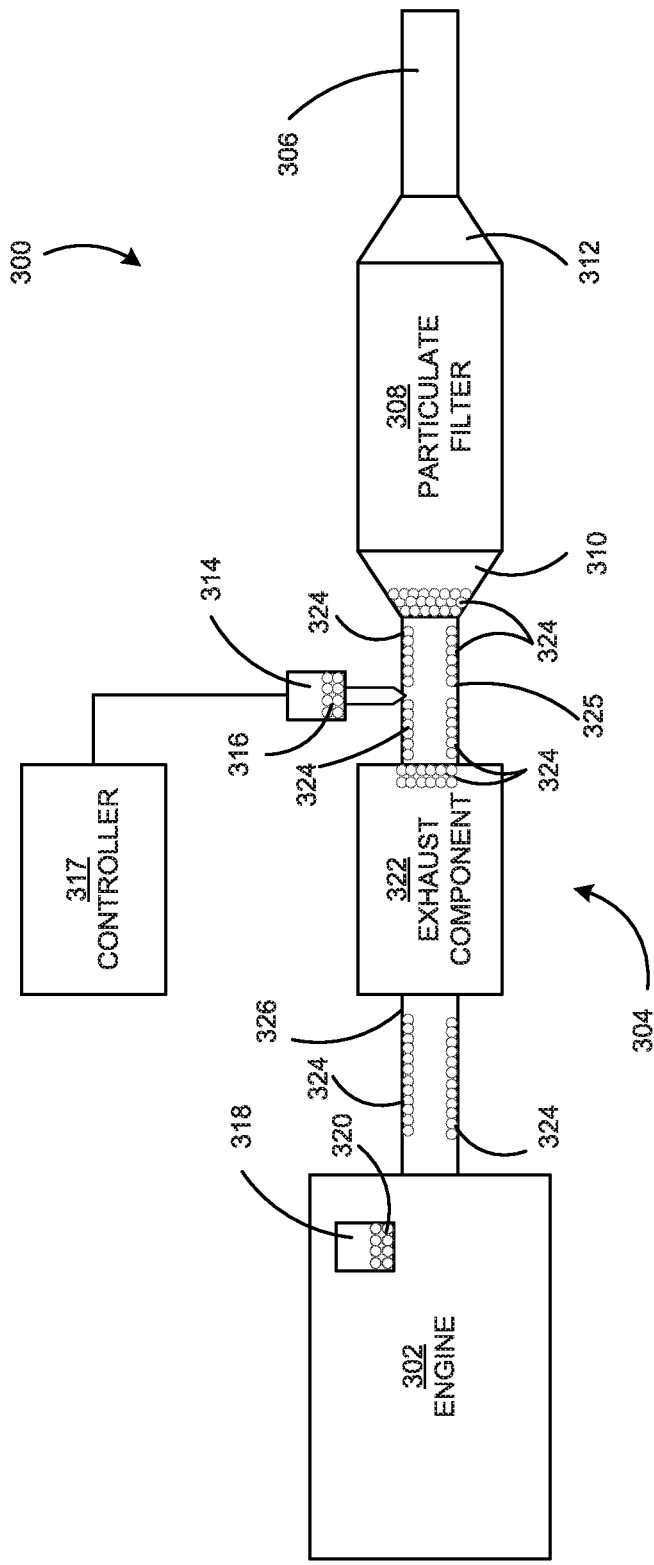
FIG. 3 is a block diagram of a system including an engine and an exhaust aftertreatment system fluidly coupled to the engine, according to an example embodiment.

FIG. 3 is a block diagram of a system 300 including an engine 302 and an exhaust aftertreatment system 304 fluidly coupled to an exhaust manifold (not shown) of the engine 302, according to an example embodiment. The engine 302 can be a compression-ignited or a spark-ignited engine and can be powered by any of various fuels, such as diesel, natural gas, gasoline, etc. In one embodiment, the engine 302 is a diesel or a lean-burn gasoline engine. In operation, the engine 302 expels exhaust gas, which flows downstream from the engine 302 through the exhaust aftertreatment system 304. Generally, the exhaust aftertreatment system 304 is configured to remove various chemical and particulate emissions present in the exhaust gas.

The exhaust aftertreatment system 304 includes an exhaust passage 306 and a particulate filter 308. The exhaust passage 306 is in fluid communication with the engine 302 so as to receive the exhaust gas. The particulate filter 308 is operatively coupled to (e.g., positioned along) the exhaust passage 306 such that the particulate filter 308 is in fluid communication with the engine 302 and will receive exhaust gas via the exhaust passage 306. The particulate filter 308 is configured to remove PM, such as, soot, dust, inorganic particles, and the like from the exhaust gas received from the engine 302.

The particulate filter 308 can include an inlet cone 310 and an outlet cone 312. The inlet cone 310 is located at an upstream end of the particulate filter 308 and the outlet cone 312 is located at a downstream end of the particulate filter 308. It should be understood that the terms "upstream" and "downstream," as used herein, are defined relative to the flow direction of the exhaust gas from the engine 302 and through the exhaust passage 306.

Various structures, devices, etc. can be provided to pre-condition the particulate filter 308 with ash so as to improve fractional efficiency of the particulate filter. As will be appreciated, the particulate filter 308 can be pre-conditioned with ash in various ways, according to various embodiments. The preloading amount of ash and the duration over which the ash is dispensed into the particulate filter 308 depends on characteristics of the engine 302, of the particulate filter 308, and of the overall exhaust aftertreatment system 304 (e.g., engine displacement, intended fuel, aftertreatment system architecture, particulate filter volume, etc.). According to various embodiments, the preloading amount of ash with which to pre-condition the particulate filter 308 is determined based on a difference between an initial fractional efficiency of the particulate filter and a target fractional efficiency. For example, the preloading amount of ash is determined via the method 200 of FIG. 2.

The preloading amount of ash is dispensed into the particulate filter 308 so as to pre-condition the particulate filter 308.

In an embodiment of the exhaust aftertreatment system 304, the particulate filter 308 can be pre-coitioned with ash by an ash dispenser 314 including ash powder 316. The ash dispenser 314 is configured to dispense the ash powder 316 into the exhaust gas upstream of the particulate filter 308. Upon being dispensed into the exhaust gas, the ash powder 316 is dispersed in the exhaust gas and flows into the particulate filter 308 so as to pre-condition the particulate filter 308 with a uniform distribution of the ash powder 316. According to various embodiments, the ash dispenser 314 includes a piezoelectric valve configured to controllably dispense a desired amount of the ash powder 316. In other embodiments, the ash dispenser 314 includes another type of valve known to those of skill in the art for use in automotive exhaust aftertreatment systems. In some embodiments, the ash dispenser 314 is an aerosol sprayer and the ash powder 316 is an aerosol (e.g., a suspension of fine particles, etc.). The aerosol may be produced via sieving and the size of the particles in the aerosol may be controlled by the sieve used to perform the sieving.

The ash powder 316 may be produced through a commercial process that does not involve the operation of an internal combustion engine (e.g., the engine 302, etc.). For example, the ash powder 316 may be produced via a combustion process. This combustion process may utilize a burner rig (e.g., diesel particulate generator (DPG), diesel particulate filter testing system, diesel particulate filter cleaning system, etc.) to generate the ash powder 316. The burner rig may be large scale so as to generate the ash powder 316 quickly and inexpensively. In other examples, the ash powder 316 may be produced via a chemical process. This chemical process may involve chemicals, such as calcium sulfate ($CaSO_4$) (e.g., calcium sulfate powder, etc.), oils (e.g., engine oil, lubricating oil, etc.), and/or solid media. The ash powder 316 may also be produced from an aging process (e.g., a lab-aging process, etc.).

In some embodiments where the system 300 includes the ash dispenser 314, the system 300 does not include the filter 318 or the additive material 320. Similarly, in some embodiments where the system 300 includes the filter 318, the system 300 does not include the ash dispenser 314 or the ash powder 316.

In some embodiments, the exhaust aftertreatment system 304 includes a controller 317 that is electrically or communicatively coupled to the ash dispenser 314. The controller 317 is configured to control the ash dispenser 314 to dispense the desired amount of the ash powder 316 into the exhaust passage 306. The controller 317 may include a microprocessor, an application-specific integrated circuit ("ASIC"), a field-programmable gate array ("FPGA"), etc., or combinations thereof. The controller 317 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory ("EEPROM"), erasable programmable read only memory ("EPROM"), flash memory, or any other suitable memory from which the controller 317 can read instructions. The instructions may include code from any suitable programming language.

In an embodiment of the system 300, the particulate filter 308 can be pre-conditioned with ash by a filter 318 that is configured to release an additive material 320 that generates ash to preload the particulate filter 308. The filter 318 includes a chemically active filter medium configured to release the additive material 320 in response to the chemically active filter medium being exposed to a fluid.

In some embodiments, the filter 318 is a fuel filter positioned in fuel utilized by the engine 302. The filter 318 includes a housing containing a chemically active filter medium is configured to controllably release the additive material 320 into the fuel during initial operation of the engine 302. The additive material 320 is configured to cause an increased amount of ash to be generated when the fuel is combusted in the engine 302. The filter 318 is configured such that the amount of additive material 320 it releases into the fuel (e.g., the rate of additive material 320 dosed into the fuel, etc.) corresponds to an amount necessary to produce the preloading amount of ash needed to precondition the particulate filter 308 to achieve the target fractional efficiency (e.g., the rate at which ash is loaded onto the particulate filter 318, etc.). In some embodiments, the filter 318 is another type of filter, such as a lubricating oil filter, a hydraulic oil filter, a coolant filter, a DPF, or another type of filter.

While ash is being loaded onto the particulate filter 318 (e.g., while the ash dispenser 314 is dispensing the ash powder 316 into the exhaust gas upstream of the particulate filter 308, while the additive material 320 is being dosed into the fuel and the fuel is being routed through the engine 302, etc.) operation of the engine 302 may be carefully controlled (e.g., variation of the output shaft speed of the engine 302 is minimized, variation of the fuel consumption of the engine 302 is minimized, variation of a throttle position of the engine 302 is minimized, etc.) so as to provide optimal distribution of ash being loaded onto the particulate filter 318 (e.g., to prevent ash from being loaded unevenly onto the particulate filter 318, etc.).

In some embodiments of the exhaust aftertreatment system 304, the particulate filter 308 can be pre-conditioned with ash by an exhaust component 322 positioned upstream of the particulate filter 308. The exhaust component 322 includes a combination of ash and binder material 324 attached to an interior surface of the exhaust component 322. The combined ash and binder material 324 is configured such that the binder material will release the ash from the exhaust component 322 in response to being exposed to exhaust gas above a predetermined temperature so as to preload the predetermined amount of ash into the particulate filter 308.

In some embodiments, the combined ash and binder material 324 is attached to the inlet cone 310 of the particulate filter 308. In a similar manner as described above with regard to the exhaust component 322, the combined ash and binder material 324 is configured to release from the inlet cone 310 in response to being exposed to exhaust gas above a predetermined temperature so as to preload the predetermined amount of ash into the particulate filter 308.

In some embodiments, the combined ash and binder material 324 is attached to an intermediate exhaust conduit 325. The intermediate exhaust conduit 325 is positioned between the exhaust component 322 and the particulate filter 308. The ash dispenser 314 is coupled to the intermediate exhaust conduit 325. The combined ash and binder material 324 may be attached to the intermediate exhaust conduit 325 upstream and/or downstream of the ash dispenser 314.

In some embodiments, the combined ash and binder material 324 is attached to interior surfaces of an upstream exhaust component 326. The upstream exhaust component 326 may be an exhaust conduit, an exhaust manifold, an exhaust port, or a portion of a turbocharger assembly (e.g., a turbine, etc.). In such embodiments, the combined ash and binder material 324 is configured to release from the upstream exhaust component 326 in response to attaining a temperature above a threshold. The combined ash and binder material 324 is heated by an interaction with the engine 302 (e.g., via conduction, etc.) and an interaction with exhaust gases (e.g., via convection, via conduction, etc.).

In some embodiments, the particulate filter 308 includes an aqueous solution or suspension that is pre-applied thereto. The aqueous solution is configured to decompose or evaporate into a layer of ash in response to exposure to heat. The amount (e.g., volume or mass) and/or the composition of the aqueous solution or suspension corresponds to an amount necessary to produce the preloading amount of ash needed to precondition the particulate filter 308 to achieve the target fractional efficiency.

While the ash dispenser 314, filter 318, and combined ash and binder material 324 are shown all together in FIG. 3, it is understood that embodiments can be constructed in which only one or two of them may be included to generate the ash used for pre-conditioning.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry (e.g., an FPGA or an ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements;

values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An exhaust gas aftertreatment system for operative connection to an engine, the exhaust gas aftertreatment system comprising:
    a particulate filter;
    an ash dispenser coupled to an exhaust conduit upstream of the particulate filter, the ash dispenser configured to release a predetermined amount of ash into exhaust gas produced by the engine so as to pre-condition the particulate filter; and
    a controller configured to maintain an operating parameter of the engine constant while the ash dispenser releases the predetermined amount of ash.

2. The exhaust gas aftertreatment system of claim 1, wherein the predetermined amount of ash is sufficient to achieve a target fractional efficiency of the particulate filter.

3. The exhaust gas aftertreatment system of claim 2, wherein the predetermined amount of ash is determined based on a difference between the target fractional efficiency and an initial fractional efficiency of the particulate filter, the target fractional efficiency being a fractional efficiency required for exhaust gas exiting the particulate filter to have a measured particulate matter emission level below a threshold particulate matter emission level.

4. The exhaust gas aftertreatment system of claim 3, wherein the measured particulate matter emission level and the threshold particulate matter emission level are each defined with respect to particulate number.

5. The exhaust gas aftertreatment system of claim 1, wherein the ash dispenser releases the predetermined amount of ash during a break-in period of the engine.

6. The exhaust gas aftertreatment system of claim 1, wherein the particulate filter is a diesel particulate filter.

7. The exhaust gas aftertreatment system of claim 1, wherein the particulate filter is a gasoline particulate filter.

8. The exhaust gas aftertreatment system of claim 1, further comprising:
    an intermediate exhaust component coupled to the exhaust conduit upstream of the particulate filter; and
    a binder material coupled to at least one of the intermediate exhaust component or the particulate filter.

9. The exhaust gas aftertreatment system of claim 1, wherein:
    the ash dispenser is an aerosol sprayer; and
    the ash is an aerosol.

10. The exhaust gas aftertreatment system of claim 1, further comprising:
    an exhaust component positioned upstream of the particulate filter; and
    an ash-binder material attached to an interior surface of the exhaust component.

* * * * *